United States Patent
Wilcher

(10) Patent No.: US 6,579,450 B2
(45) Date of Patent: Jun. 17, 2003

(54) NON-METALLIC TOOTH SEGMENT AND BAR RACK DESIGN

(75) Inventor: Stephen B. Wilcher, Harleysville, PA (US)

(73) Assignee: United States Filter Corporation, Palm Desert, CA (US)

( * ) Notice: Subject to any disclaimer, the term of this patent is extended or adjusted under 35 U.S.C. 154(b) by 9 days.

(21) Appl. No.: 09/975,222

(22) Filed: Oct. 11, 2001

(65) Prior Publication Data

US 2003/0070970 A1 Apr. 17, 2003

(51) Int. Cl.$^7$ ............................................... B01D 29/64
(52) U.S. Cl. ........................ 210/159; 210/162; 210/413
(58) Field of Search ................................ 210/154, 159, 210/162, 170, 407, 413, 499

(56) References Cited

U.S. PATENT DOCUMENTS

| | | | |
|---|---|---|---|
| 1,839,186 A | | 12/1931 | Leonard |
| 2,634,863 A | * | 4/1953 | Haver ........................ 210/159 |
| 3,615,012 A | | 10/1971 | Verbandt |
| 3,975,275 A | | 8/1976 | Kato |
| 4,138,340 A | | 2/1979 | Suzuki et al. |
| 4,521,306 A | | 6/1985 | Day |
| 4,725,365 A | * | 2/1988 | Albrecht, III ............... 210/413 |
| 4,857,182 A | * | 8/1989 | Jackson ...................... 210/159 |
| 5,167,803 A | * | 12/1992 | Newton et al. ............. 210/159 |
| 5,387,336 A | | 2/1995 | Bormet et al. |
| 5,387,337 A | | 2/1995 | Byers |
| 5,425,875 A | * | 6/1995 | Duperon ..................... 210/159 |
| 5,573,659 A | | 11/1996 | Johnson, Jr. |
| 5,618,415 A | | 4/1997 | Johnson, Jr. |
| 5,715,668 A | | 2/1998 | Filion et al. |
| 5,730,862 A | * | 3/1998 | Mahr ......................... 210/162 |
| 5,922,195 A | | 7/1999 | Pastore |
| 6,063,293 A | * | 5/2000 | Schloss ...................... 210/162 |
| 6,129,215 A | | 10/2000 | Brauch et al. |

* cited by examiner

Primary Examiner—Christopher Upton
(74) Attorney, Agent, or Firm—Michael Best & Friedrich LLP

(57) ABSTRACT

The bar screen of the present invention includes a bar rack and a cleaning rake. The bar rack includes a plurality of aligned bars and is adapted to be at least partially positioned within the channeled water. The cleaning rake is movably coupled to the bar rack and includes a plurality of tooth segments. Each tooth segment includes a base portion and a plurality of teeth. The base portion is coupled to the cleaning rake, and the plurality of teeth is connected to the base portion. Each tooth of the plurality of teeth is adapted to be inserted between adjacent bars on the bar rack to remove debris that has accumulated on the upstream side of the bar rack. The teeth are breakable from the base when the teeth engage immovable debris trapped within the bar rack.

21 Claims, 5 Drawing Sheets

NON-METALLIC TOOTH SEGMENT AND BAR RACK DESIGN

FIELD OF THE INVENTION

The invention relates to bars screens, and more particularly to bar screens having cleaning rakes.

BACKGROUND OF THE INVENTION

Bar screens are used to collect debris from channeled water flowing into water treatment plants, industrial sites, drainage facilities, or overflow control facilities. A bar screen generally includes a bar rack and a cleaning rake. The bar rack includes a series of aligned metal bars that are at least partially positioned within the channeled water. The cleaning rake is movably coupled to the bar rack and lifted along the length of the bar rack to periodically engage the bar rack and remove debris that has accumulated on the upstream side of the bar rack. The cleaning rake includes a plurality of teeth that are cantilever mounted along the length of the cleaning rake.

The teeth are typically made from steel or cast-iron for strength. The general shape of the teeth is dictated by the size of the openings between adjacent bars of the bar rack, the degree that the teeth are required to penetrate into the bar rack, and the engagement clearances necessary to avoid metal to metal contact. In light of these requirements, the teeth are typically relatively long and thin. These prior art teeth can be easily bent if they are improperly aligned with the bar rack or if they engage debris that is trapped between the bars. Once a single tooth is bent, the entire cleaning rake cannot properly engage the bar rack, rendering the bar screen inoperable. Therefore, the bent teeth of the cleaning rake must be replaced immediately. In addition, the channeled water must be drained to locate the problem area that caused the damage to occur, and all of the trapped debris that has collected between the bars of the bar rack must be manually removed.

SUMMARY OF THE INVENTION

The bar screen of the present invention decreases manufacturing costs by providing a tooth segment that can be injection molded. Injection molding achieves critical tolerances, insures repeatability of the parts, and offers a wide range of material options. The non-metallic tooth segment also increases the effectiveness of the bar screen by providing individual teeth that are designed to fracture such that the cleaning rake is allowed to continue functioning after a tooth or tooth segment has failed. The present invention also decreases maintenance and repair costs. Specifically, the cleaning rake continues to operate after a tooth fails allowing the cleaning rake to be repaired at a convenient time after the failure. Additionally, the tooth segments can be replaced individually or alternatively modules of the teeth can be replaced at significantly lower cost than when utilizing machined stainless teeth or cast-iron segments.

The present invention is directed to a bar screen for removing debris from channeled water. The bar screen includes a bar rack and a cleaning rake. The bar rack includes a plurality of aligned bars and is adapted to be at least partially positioned within the channeled water. The cleaning rake is movably coupled to the bar rack and includes a plurality of tooth segments or modules. Each tooth segment includes a base portion and a plurality of teeth. The base portion is coupled to the cleaning rake, and the plurality of teeth are connected to the base portion. Each tooth of the plurality of teeth is adapted to be inserted between adjacent bars on the bar rack to remove debris that has accumulated on the upstream side of the bar rack. The teeth are breakable from the base when the teeth engage immovable debris trapped within the bar rack.

The present invention is also directed to a tooth segment for a cleaning rake used in a bar screen. The bar screen includes a bar rack having a plurality of bars. The tooth segment includes a base portion and a plurality of teeth. The base portion is adapted to be coupled to the cleaning rake, and the plurality of teeth are connected to the base portion. Each of the plurality of teeth is adapted to be inserted between adjacent bars on the bar rack and configured to break from the base when subjected to a sufficient force.

Other features and advantages of the invention will become apparent to those skilled in the art upon review of the following detailed description, claims, and drawings.

Figure 1:
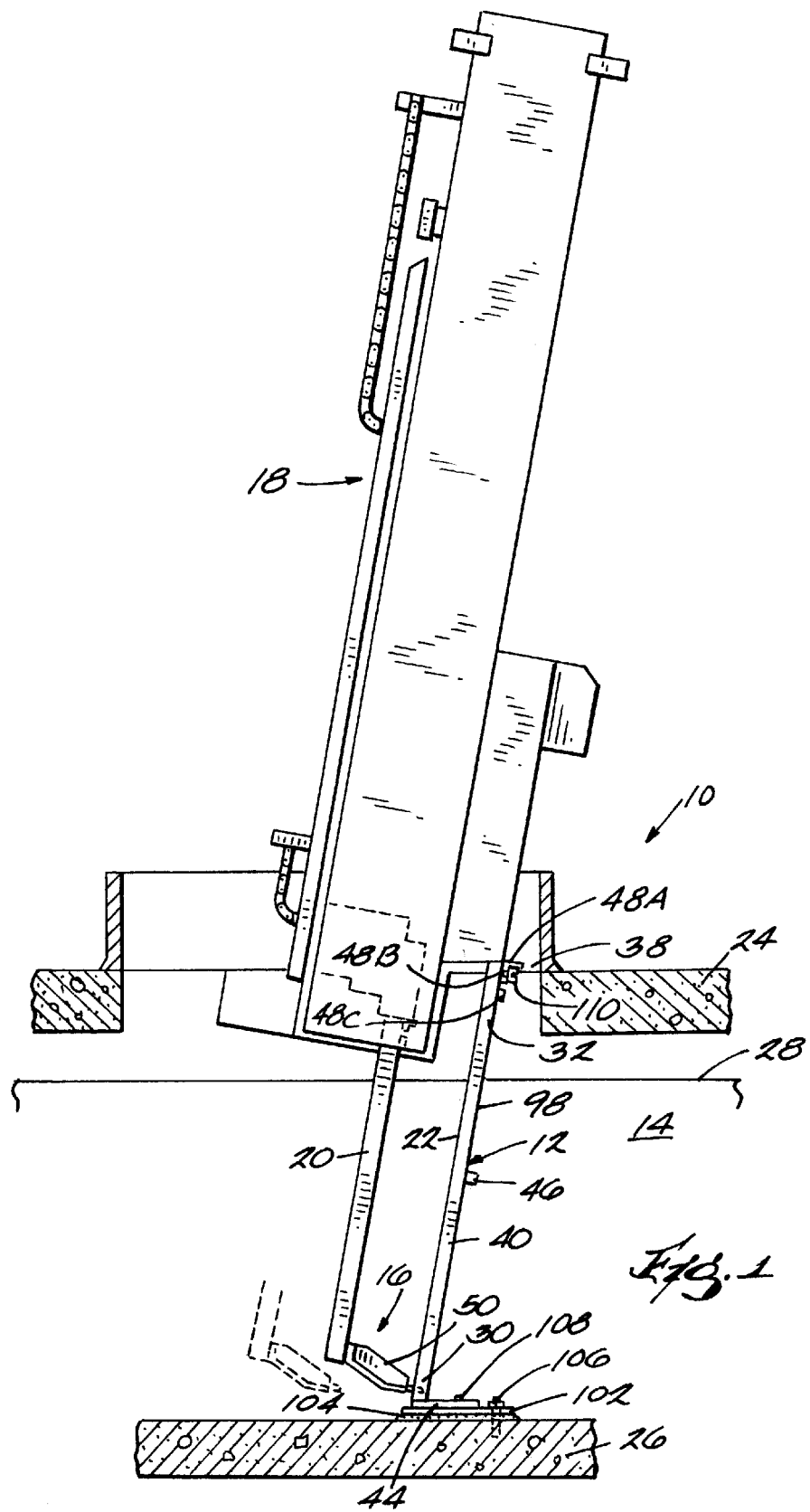
FIG. 1 is a side elevation view of a bar screen embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a bar screen 10 embodying the present invention. The bar screen includes a bar rack 12 that is positioned within channeled water 14 to prevent debris from flowing past the bar rack 12 with the channeled water 14. The bar screen 10 also includes a cleaning rake 16 that is coupled to a drive system 18 through a rake arm 20. The drive system 18 moves the cleaning rake 16 into engagement with the bar rack 12 and along the height of the bar rack 12 to remove the trapped debris from the upstream side 22 of the bar rack 12. The drive system 18 also moves the cleaning rake 16 out of engagement with the bar rack 12 and away from the bar rack 12 to dispose of the debris collected from the cleaning rake 16. The drive system 18 is positioned above the channeled water 14 and supported by a foundation 24 above the channeled water 14.

The bar rack 12 extends above the surface 28 of the channeled water 14 from a base 26 underlying the channeled water 14 such that the bar rack 12 extends the entire depth and width of the channeled water 14. The bar rack 12 is angled relative to the base 26 such that the lower end 30 of the bar rack 12 adjacent to the base 26 is positioned farther upstream than the upper end 32 of the bar rack 12 adjacent to the surface 28 of the channeled water 14.

Figure 3:
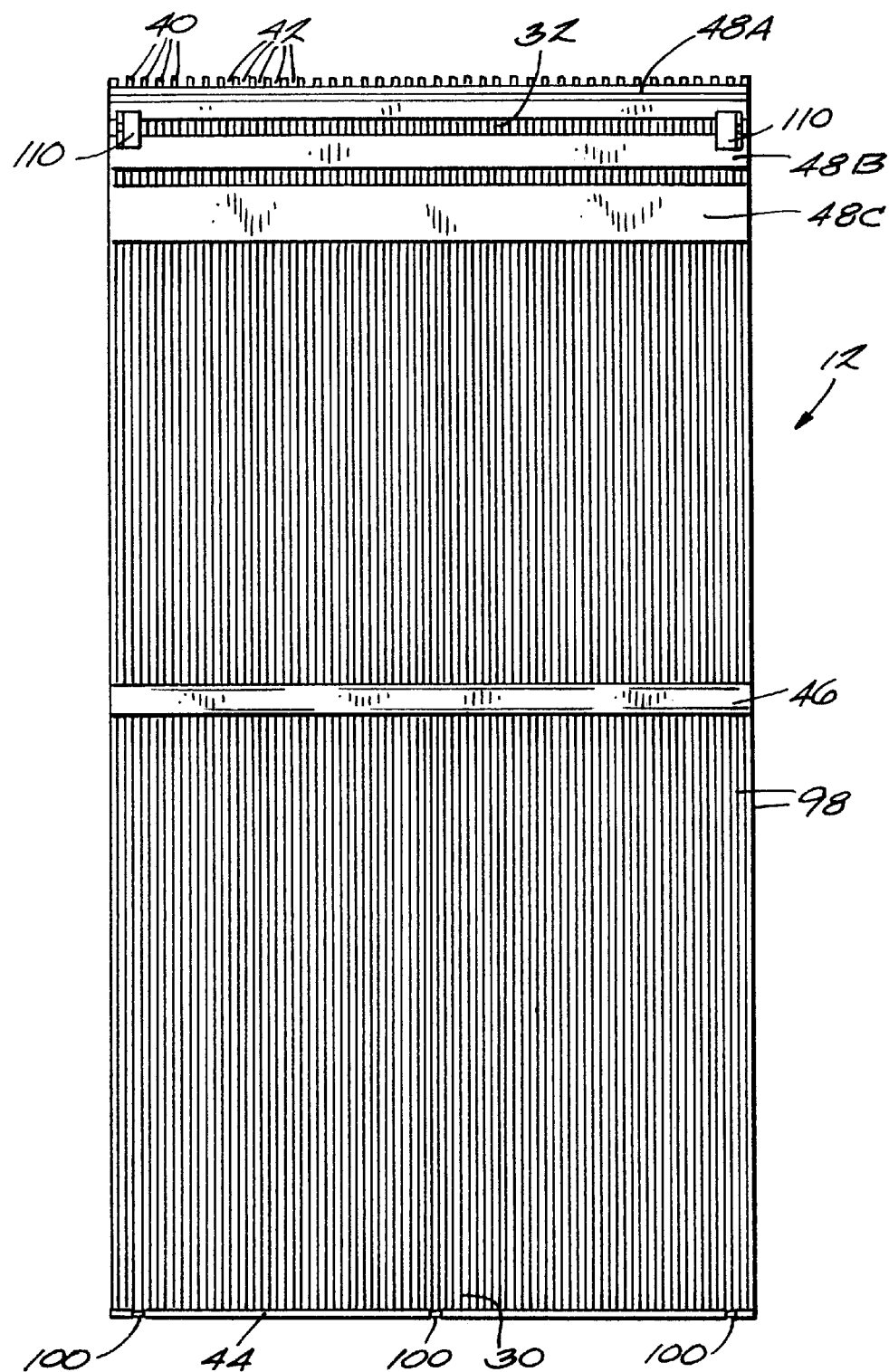
FIG. 3 is a rear view of the bar rack shown in FIG. 2.

As shown in FIG. 3, the bar rack 12 includes a plurality of equally spaced elongated bars 40 that are parallel to each other. The bars 40 are substantially identically shaped and each include a length, a width, and a thickness. The lengths of the bars 40 define the height of the bar rack 12, and the widths of the bars 40 define the depth of the bar rack 12, which is commonly about 2.5 inches. Gaps 42 between adjacent bars 40 of the bar rack 12 can be wider than ½ inches for coarse bar screens 10 and narrower than ½ inches for narrow bar screens 10. The gaps 42 are approximately ¼ or ⅜ inches in the narrow bar screens 10.

Figure 4:
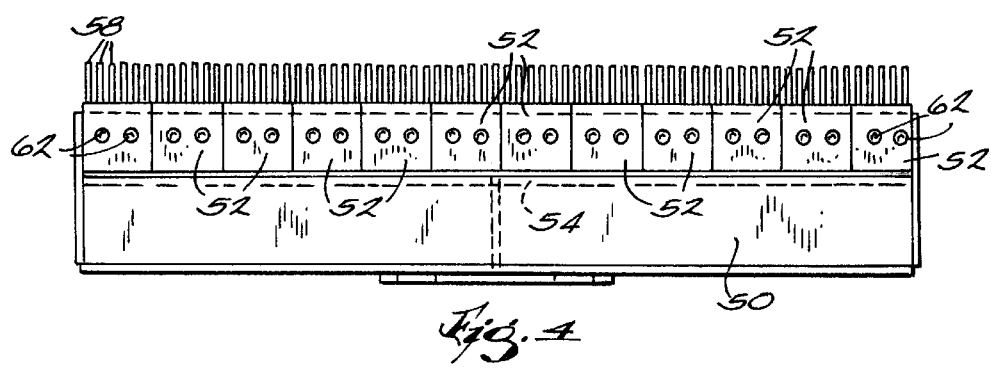
FIG. 4 is a top view of the cleaning rake shown in FIG. 2.
Figure 6:
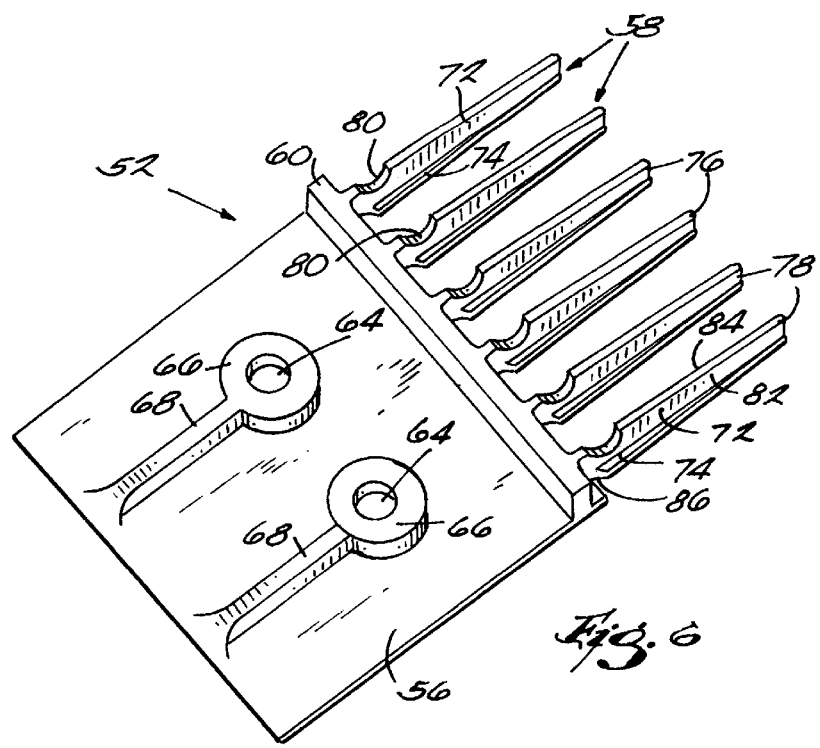
FIG. 6 is a perspective view illustrating a tooth segment of the cleaning rake shown in FIG. 4.
Figure 5:
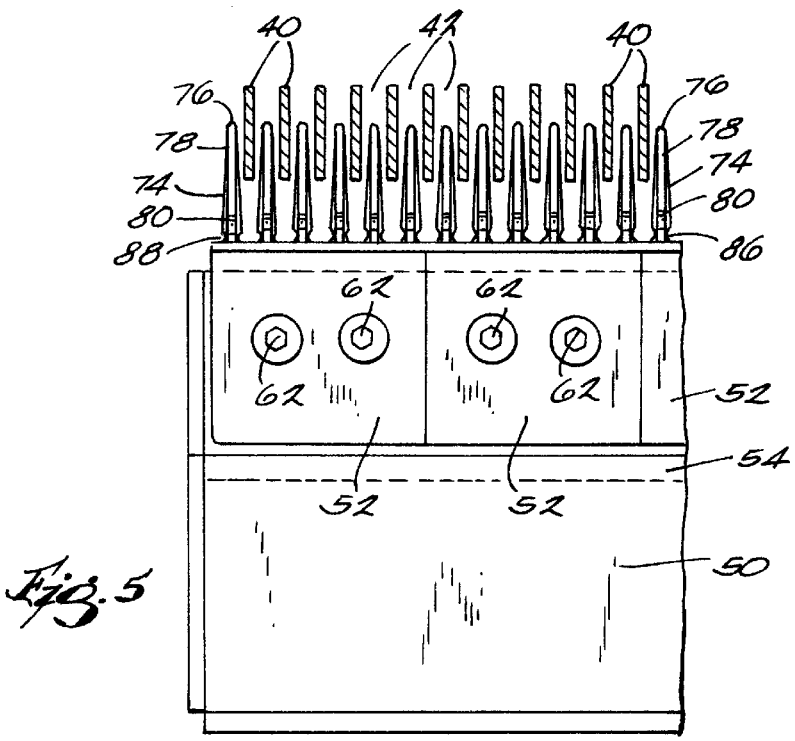
FIG. 5 is an enlarged top view illustrating a portion of the cleaning rake shown in FIG. 4.

The cleaning rake 16 is shown in FIGS. 4 and 5 and includes a frame 50 and a plurality of tooth segments 52. The tooth segments 52 are connected in an end to end relationship along a mounting strip 54 of the frame 50. Each tooth segment 52 is substantially identically shaped and will be described in detail with reference to FIG. 6.

The tooth segment 52 includes a base portion 56 and a plurality of teeth 58 which are cantilever mounted to a raised forward edge 60 of the base portion 56. The base portion 56 is mounted to the mounting strip 54 by fasteners 62 that are inserted through the apertures 64 and into the mounting strip 54. Each aperture 64 is surrounded by a raised boss 66 that is supported by a rearwardly extending rib 68. The rearwardly extending ribs 68 extend from the raised bosses 66 to the rearward edge of the base 56.

Each tooth 58 includes a forwardly projecting flange 72 and a perpendicular carrying shelf 74 connected to the bottom of the flange 72. The flange 72 includes a leading edge 76 that has a full radius which enhances the engagement of the teeth 58 with the bar rack 12. The flange 72 includes a top edge 78 that has an upper notch 80 that is located adjacent to the forward edge 60 of the base 56. The length of the flange 72 is dependent upon the desired tooth penetration into the bar rack 12. Tooth penetration is defined by the length of the flange 72 compared with the width of the bars 40. For example, a flange 72 that is equal in length to the width of the bars 40 is capable of achieving 100% tooth penetration into the bar rack 12. The flanges 72 shown in FIG. 5, illustrate approximately 60% tooth penetration into the bar rack 12 and are capable of at least 85% tooth penetration into the bar rack 12.

The flange 72 divides the carrying shelf 74 into two substantially equal first and second sides 82, 84. The carrying shelf 74 is wider than the flange 72 adjacent to the base 86 and narrows to the width of the leading edge 76 of the flange 72. The first and second sides 82, 84 of the carrying shelf 74 include first and second notches 86, 88, respectively, adjacent to the forward edge 60 of the base 56.

The tooth segments 52 are injection molded with a thermoset plastic. This type of plastic provides a rigid and strong material that allows for minor flexing during engagement with the bar rack 12. The material used to manufacture the tooth segments 52 also allow the teeth 58 to fracture without significant deformation when the teeth 58 are subjected to a sufficient force. A sufficient force can be generated when a tooth 58 incorrectly aligns with the bar rack 12 or when a tooth 58 is obstructed by debris trapped between the bars 40 of the bar rack 12 during movement of the cleaning rake 16. Specifically, the tooth segments 52 can be molded from the following polymers manufactured by GE PLASTICS: (i) Lexan 3413R Polycarbonate, 30% glass filled; (ii) Noryl GFN2 PPE+PS, 20 glass filled; or (iii) Noryl GFN3 PPE+PS, 30% glass filled.

The notches 80, 86, 88 provide the teeth 58 with a designed fracture location such that the fracture of the tooth 58 will begin to propagate and break apart from the base 56 at the location of the notches 80, 86, 88. For example, when the cleaning rake 16 is being raised to remove debris from the bar rack 12 and a tooth 58 is obstructed by trapped debris, the fracture will begin at the location of the upper notch 80. Alternatively, when the cleaning rake 16 is moved into engagement with the bar rack 12 and a tooth 58 incorrectly aligns with the bar rack 12, the fracture will begin at either the first or second notch 86, 88 depending upon the direction that the tooth 58 bends.

During operation of the bar screen 10, the drive system 18 moves the cleaning rake 16 (from the location shown in phantom lines in FIGS. 1 and 2) into engagement with the bar rack 12. As shown in FIG. 5, when the cleaning rake 16 is engaged with the bar rack 12, the teeth 58 of the tooth segments 52 are positioned within the respective gaps 42 between adjacent bars 40 of the bar rack 12. As discussed earlier, the gaps 42 can be as narrow as ¼ inch and the teeth 58 can achieve at least 85% tooth penetration into the bar rack 12.

If a tooth 58 misaligns with its respective gap 42 and contacts the upstream edge of the bar 40, the tooth 58 will bend as the cleaning rake 16 is moved into engagement with the bar rack 12. The tooth 58 is allowed to bend slightly to allow minor corrections to the alignment of the tooth 58 between the bars 40, however, the tooth 58 will fracture at either the first or second notch 86, 88 and break off from the forward edge 60 of the base 56 when improper alignment with the bars 40 causes the tooth 58 to bend more than approximately 15 degrees. The bar screen 10 will continue to operate even after a tooth 58 has fractured because the tooth 58 is designed to break off completely adjacent to the forward edge 60 of the base 56 such that nothing is left of the tooth 58 to interfere with the continued operation of the bar screen 10.

After the cleaning rake 16 engages the bar rack 12, the drive system 18 moves the cleaning rake 16 along the height of the bar rack 12 to remove all of the debris located on the upstream side 22 of the bar rack 12. Although the configuration of the teeth 58 provides the teeth 58 with adequate strength to remove all types of debris from the bar rack 12, the teeth 58 occasionally come into contact with trapped debris that cannot be removed from the bar rack 12 with a cleaning rake 16. If a tooth 58 encounters any such trapped material, the tooth 58 will fracture at the upper notch 80 and completely break off from the forward edge 60 of the base 56 as the cleaning rake 16 continues to move upward to clean the bar rack 12. Similar to the fracture discussed above, the tooth 58 completely breaks away such that nothing is left that would obstruct the operation of the bar screen 10.

After the cleaning rake. 16 is swept across the entire height of the bar rack 12, the drive system 18 moves the cleaning rake 16 out of engagement with the bar rack 12. The drive system 18 then moves the cleaning rake 16 away from the bar rack 12 and the channeled water 14 to remove the debris from the teeth 58 of the cleaning rake 16 and into a receptacle located on the foundation 24.

The tooth segments 52 can be replaced on the cleaning rake 16 at any convenient time because improper alignment or trapped debris does not deform the teeth 58 or cleaning rake 16 in a way that would require immediate maintenance. In addition, only the tooth segments 52 that have damaged teeth 58 are replaced as opposed to common types of cleaning rakes that require replacement of the entire cleaning rake 16 when the teeth become damaged.

Referring again to FIGS. 2 and 3, the bar rack 12 includes a bottom support plate 44, a middle support plate 46, and three upper support plates 48A, 48B, 48C that all extend across the width of the bar rack 12, maintain the spacing between the bars 40 of the bar rack 12, and provide rigidity to the bar rack 12. The base support plate 44 is connected to the bottom edges of the lower ends 30 of the bars 40. The upper support plates 48A, 48B, 48C are connected to downstream edges 98 of the upper ends 32 of the bars 40. The middle support plate 46 is connected to the downstream edges 98 at the center of the bars 40. The supports 44, 46, 48A, 48B, 48C are substantially parallel with each other and are substantially perpendicular to the bars 40 of the bar rack 12.

Figure 7:
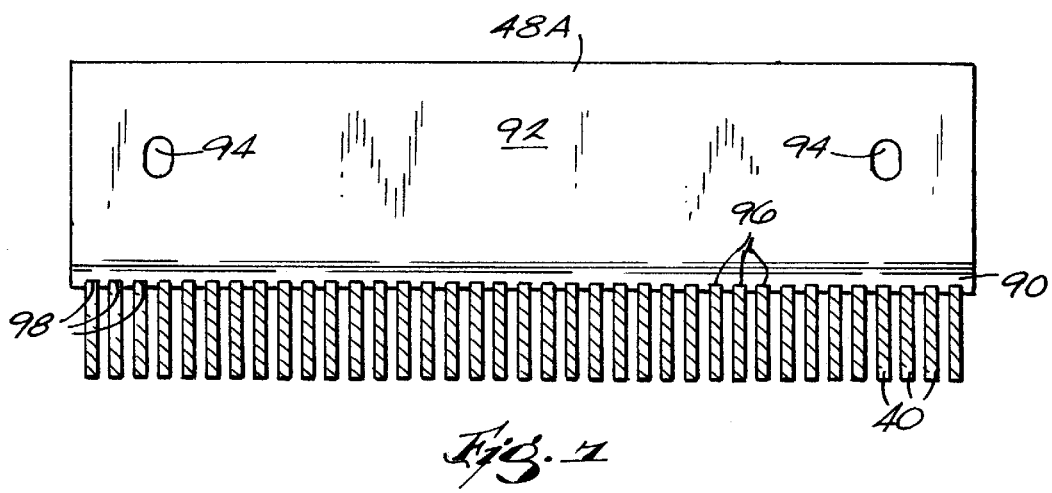
FIG. 7 is a cross-section view taken along line 7—7 in FIG. 2.

With further reference to FIG. 7, the upper support plate 48A is L-shaped in cross-section and includes an engaging face 90 that extends parallel to the bars 40 of the bar rack 12 and a mounting face 92 that extends perpendicularly away from the bars 40 of the bar rack 12. The mounting face 92 includes two mounting holes 94. Fasteners (not shown) are inserted through the mounting holes 94 and into a support frame 38 of the foundation 24 to support the upper end 32 of the bar rack 12. The engaging face 90 includes equally spaced grooves 96 that are machined into the engaging face 90 in a direction that is perpendicular to the longitudinal direction of the upper support plate 48A. The grooves 96 are located across the entire engaging face 90 and are machined to a depth that is less than the width of the bars 40. The upper support plate 48A is connected to the bars 40 such that downstream edges 98 of the upper ends 32 of the bars 40 are positioned within the grooves 96 of the upper support 48A.

Figure 8:
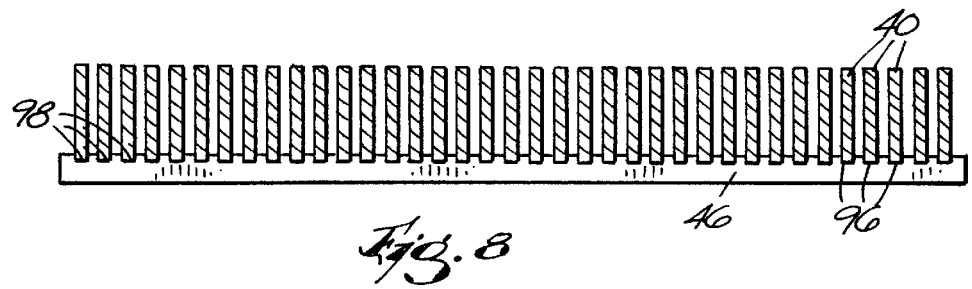
FIG. 8 is a cross-section view taken along line 8—8 in FIG. 2.

The upper support plates 48B, 48C and the middle support plate 46, as shown in FIG. 8, are elongated plates that each includes a face that includes grooves 96 that are machined in a similar manner to the grooves 96 of the upper support plate 48A. The upper support plates 48B, 48C and the middle support plate 46 are connected to the bars 40 such that the downstream edges 98 of the bars 40 are positioned within the grooves 96 of the upper support plates 48B, 48C and the middle support plate 46.

Figure 9:
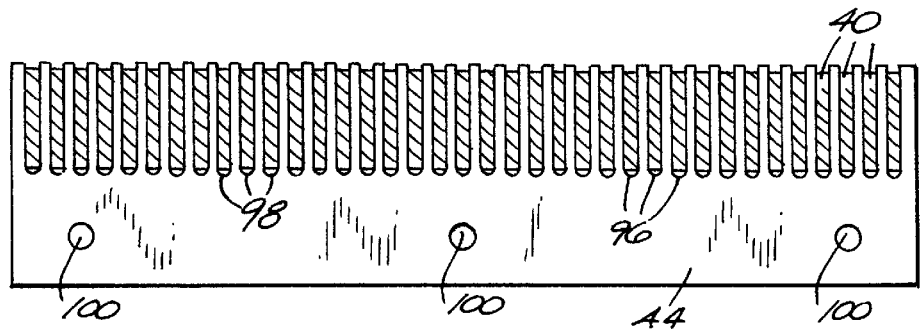
FIG. 9 is a cross-section view taken along line 9—9 in FIG. 2.

As shown in FIG. 9, the bottom support plate 44 is an elongated plate that includes grooves 96 that are machined similar to the grooves 96 of the upper support plate 48A except that the grooves 96 of the bottom support plate 44 are machined to a depth that is greater than the width of the bars 40. The bottom support plate 44 is connected to the bars 40 such that the entire width of the lower ends 30 of the bars 40 are positioned within the grooves 96 of the bottom support plate 44. The bottom support plate 44 also includes three mounting holes 100 that are used to removably connect the bar rack 12 to the base 26. A sill plate 102 is fastened with grout 104 and anchors 106 to the base 26. The sill plate 102 includes three upwardly projecting studs 108 that extend through the mounting holes 100 of the bottom support plate 44 to maintain the position of the lower end 30 of the bar rack 12 relative to the base 26.

The grooves 96 in the upper support plates 48A, 48B, 48C, the middle support plate 46, and the bottom support plate 44 are machined with tight tolerances such that when the bars are positioned in the grooves 96 of the support plates 48A, 48B, 48C, 46, 44 the bars 40 are capable of maintaining tight positional tolerances within the bar rack 12.

Figure 2:
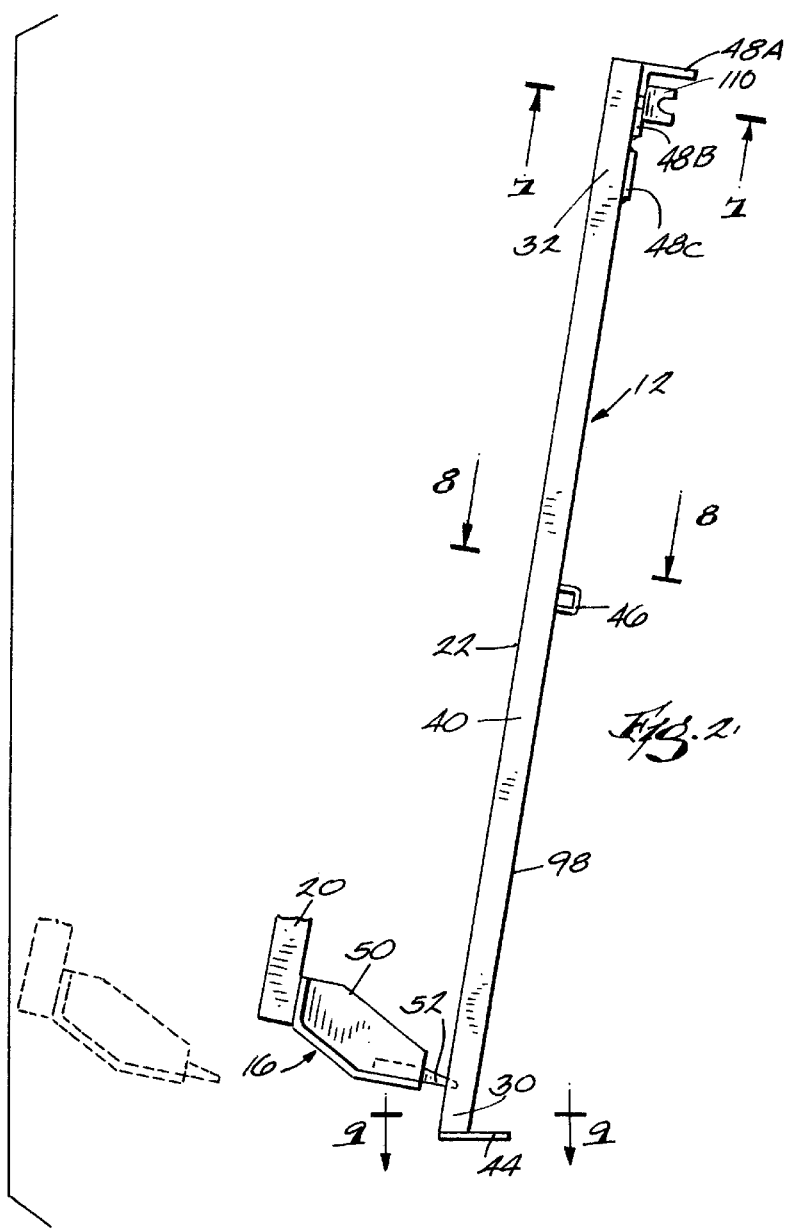
FIG. 2 is an enlarged side view of a bar rack and cleaning rake of the bar screen shown in FIG. 1.

As shown in FIGS. 1 and 2, the bar rack 12 includes two angle clips 110 that are mounted to opposite ends of the upper support plates 48A, 48B. The angle clips 110 are fastened to the support frame 38 of the foundation 24 to assist the upper support plate 48A in supporting the upper end 32 of the bar rack 12.

I claim:

1. A bar screen for removing debris from channeled water, the bar screen comprising:
   a bar rack including a plurality of aligned bars, the bar rack adapted to be at least partially positioned within the channeled water; and
   a cleaning rake that is movably coupled to the bar rack, the cleaning rake including a plurality of tooth segments, each of the plurality of tooth segments including
     a base portion coupled to the cleaning rake, and
     a plurality of teeth connected to the base portion, each of the plurality of teeth adapted to be inserted between adjacent bars on the bar rack to remove debris that has accumulated on the upstream side of the bar rack, the teeth being configured to break from the base when the teeth engage immovable debris trapped within the bar rack and when the teeth misalign with damaged bars.

2. The bar screen of claim 1, wherein the plurality of teeth are cantilever-mounted to the base portion.

3. The bar screen of claim 1, wherein the teeth are glass filled polymers.

4. The bar screen of claim 1, wherein the plurality of tooth segments are integrally formed with the base portion.

5. The bar screen of claim 1, wherein each of the plurality of teeth includes a notch located to initiate the fracture of such teeth when they engage trapped debris within the bar rack.

6. The bar screen of claim 5, wherein each of the plurality of teeth include a flange that extends outwardly from the base portion and a carrying shelf, the flange being substantially perpendicular to the carrying shelf and having a notch adjacent to the base portion.

7. The bar screen of claim 6, wherein the flange divides the carrying shelf into first and second sides, the first side including a first notch adjacent to the base portion and the second side including a second notch adjacent to the base portion.

8. The bar screen of claim 7, wherein the flange includes a leading edge having a full radius to enhance engagement with the bar rack.

9. The bar screen of claim 8, wherein the carrying shelf narrows as it extends outwardly from the base portion.

10. The bar screen of claim 1, wherein the bars are spaced approximately between ¼ and ⅜ inches apart from each other.

11. The bar screen of claim 10, wherein the bars each include a width, each of the plurality of teeth penetrating into the bar rack a distance that is at least 60% of the bar width.

12. The bar screen of claim 11, wherein each of the plurality of teeth penetrates into the bar rack a distance that is at least 85% of the bar width.

13. A tooth segment for a cleaning rake used in a bar screen, the bar screen including a bar rack having plurality of bars, the tooth segment comprising:
   a base portion adapted to be coupled to the cleaning rake, and
   a plurality of teeth connected to the base portion, each of the plurality of teeth adapted to be inserted between adjacent bars on the bar rack, the plurality of teeth configured to break from the base when subjected to a sufficient lateral force.

14. The bar screen of claim 13, wherein the plurality of teeth are cantilever-mounted to the base portion.

15. The bar screen of claim 13, wherein the teeth are glass filled polymer.

16. The bar screen of claim 13, wherein the plurality of tooth segments are integrally formed with the base portion.

17. The bar screen of claim 13, wherein each of the plurality of teeth includes a notch located to initiate the fracture of such teeth when subjected to a sufficient force.

18. The bar screen of claim 17, wherein each of the plurality of teeth include a flange that extends outwardly from the base portion and a carrying shelf, the flange being substantially perpendicular to the carrying shelf and having a notch adjacent to the base portion.

19. The bar screen of claim 18, wherein the flange divides the carrying shelf into first and second sides, the first side including a first notch adjacent to the base portion and the second side including a second notch adjacent to the base portion.

20. The bar screen of claim 19, wherein the flange includes a leading edge having a full radius to enhance engagement with the bar rack.

21. The bar screen of claim 20, wherein the carrying shelf narrows as it extends outwardly from the base portion.

\* \* \* \* \*